United States Patent [19]

Cinque

[11] 3,816,646

[45] June 11, 1974

[54] TELEVISION ENLARGING AND DISPLAY APPARATUS FOR GRAPHIC COPY

[75] Inventor: Alphonse P. Cinque, Lynbrook, N.Y.

[73] Assignee: Opaque Systems, Ltd., Hempstead, N.Y.

[22] Filed: Aug. 24, 1972

[21] Appl. No.: 283,580

[52] U.S. Cl. .......... 178/6, 178/DIG. 1, 178/DIG. 35, 178/DIG. 32

[51] Int. Cl. .......... H04n 7/18

[58] Field of Search .......... 178/DIG. 32, DIG. 1, 6.8, 178/6, 7.2, DIG. 35, DIG. 36, 7.5 SE, DIG. 30, 7.9; 179/2 TV

[56] References Cited

UNITED STATES PATENTS

| | | | |
|---|---|---|---|
| 1,889,576 | 11/1932 | Snook | 178/DIG. 32 |
| 2,956,117 | 10/1960 | Ernst et al. | 178/DIG. 1 |
| 2,994,740 | 8/1961 | Conkwright et al. | 178/DIG. 1 |
| 3,283,071 | 6/1963 | Rose et al. | 178/DIG. 1 |
| 3,461,228 | 8/1969 | Bookman | 178/DIG. 1 |
| 3,578,905 | 5/1971 | Anders et al. | 178/DIG. 1 |
| 3,699,252 | 10/1972 | Jackson | 178/7.2 |
| 3,748,384 | 7/1973 | Eisenberg | 178/DIG. 30 |
| 3,755,623 | 8/1973 | Cassagne | 178/7.85 |

FOREIGN PATENTS OR APPLICATIONS

| | | | |
|---|---|---|---|
| 674,880 | 11/1963 | Canada | 178/DIG. 1 |

OTHER PUBLICATIONS

Brochure, Telemation, Inc. Nov. 1967

Brochure, Video Engineering Co., Inc. Nov. 13, 1963

*Primary Examiner*—Robert L. Richardson

*Attorney, Agent, or Firm*—Edward H. Loveman

[57] ABSTRACT

An optical enlarging apparatus for graphic copy incluses a table for supporting the copy, and a stand carrying a television camera, a television mirror in the optical path between the camera and copy.

10 Claims, 8 Drawing Figures

TELEVISION ENLARGING AND DISPLAY APPARATUS FOR GRAPHIC COPY

This invention concerns an optical enlarging assembly, and more particularly concerns an apparatus for projecting upon the screen of a television receiver an enlarged image of graphic material supported in the apparatus.

Optical enlarging devices heretofore known have generally comprised adjustable supports of various kinds upon which graphic material has been supported. The devices included optical means by which enlarged images were picked up by reflected light and projected upon translucent screens via lens systems of various kinds. The intensity of the images were limited by the amount of light reflected from the graphic copy. To obtain readable images, high intensity projection lamps were used which generated a considerable amount of heat. This was very objectionable for various reasons. Another diadvantage of wholly optical systems was the high cost of optically corrected lens system specially designed for enlarging. still another objection to wholly optical devices was the difficulty of adjustment varying the magnification of the scanned graphic material. In addition devices of this character were not adapted for enlarging copy being typed in a typewriter.

The present invention avoids the difficulties and disadvantages of prior optical enlarging devices and systems, by providing apparatus including a special support which carries a television receiver adjustably mounted for displaying enlarged graphic material upon its display screen. The support also carries an adjustable television camera which is connected electrically by cable to the television receiver. The camera is arranged to scan graphic material such as a book, magazine, newspaper, etc. upon a copy holding table. The table has a top plate movable in a horizontal plane in mutually perpendicular directions laterally and longitudinally for conveniently positioning the graphic material. A lamp illuminates the copy being scanned by the television of video camera which transmits the image of the scanned copy electronically to the television receiver. The television receiver displays an enlargement of the scanned graphic material. The brightness of the displayed image is primarily determined by adjustment of the electron beam in the television receiver. There is no lens system interposed between camera and the graphic copy so that the assembly can be made more compact than prior optical enlarging devices and the cost of prior lens systems is avoided. The apparatus is arranged so that the graphic material can be turned page by page and moved back and forth and side to side for easy reading of its contents. The flat graphic copy such as book, magazine and the like can be replaced in the apparatus by a typewriter mounted on the adjustable table. A visually handicapped person may operate the typewriter and the television camera will scan the copy being typed and an enlarged image of the typed copy will be simultaneously projected upon the screen of the television receiver mounted above the typweriter in the apparatus.

It is therefore a principal object of the invention to provide a copy enlarging apparatus for projecting an enlarged image of the copy upon a television screen as an aid to reading the copy.

A further object of the present invention is to provide an enlarging apparatus for graphic copy as described including a television receiver, a television camera and adjustable supports for the receiver, camera and graphic copy.

Another object of the present invention is to provide enlarging apparatus as described, adapted for adjustably supporting a typewriter, so that graphic copy being typed will be scanned by the television camera and an enlarged image of the typed copy will be projected upon the screen of the television receiver in position to be read by the operator of the typewriter.

These and other objects and many of the attendant advantages of this invention will be readily appreciated as the same become better understood by reference to the following detailed description when considered in connection with the accompanying drawings in which.

Figure 1:
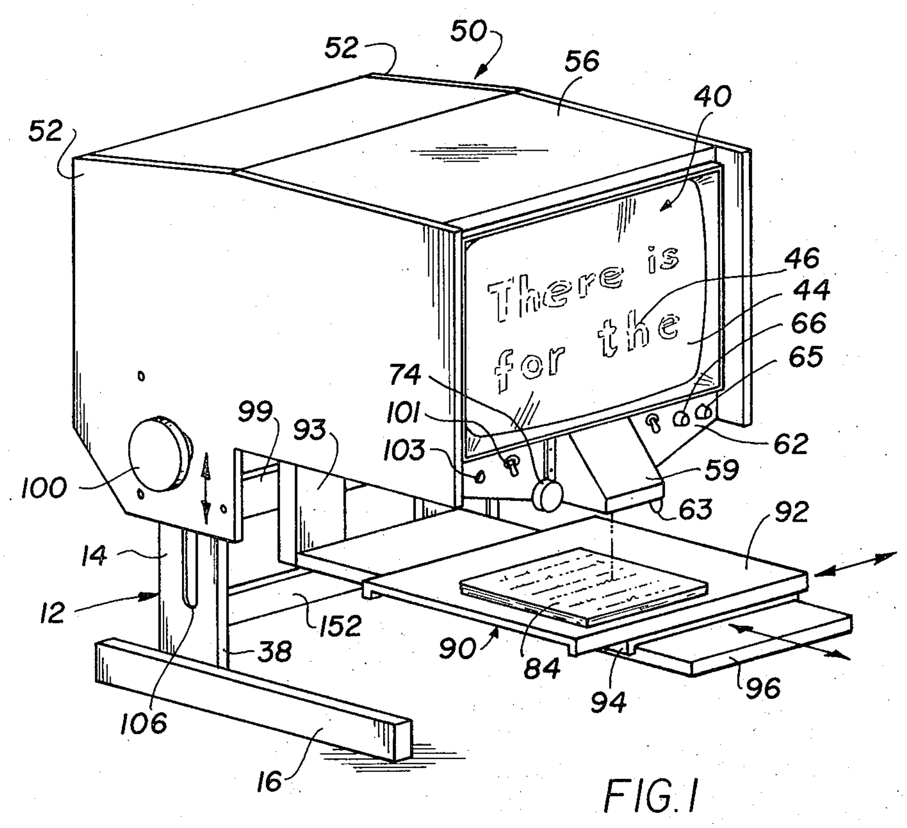
FIG. 1 is a perspective view of an apparatus for projecting an enlarged image of graphic copy, according to the invention.
Figures 2, 3, 4:
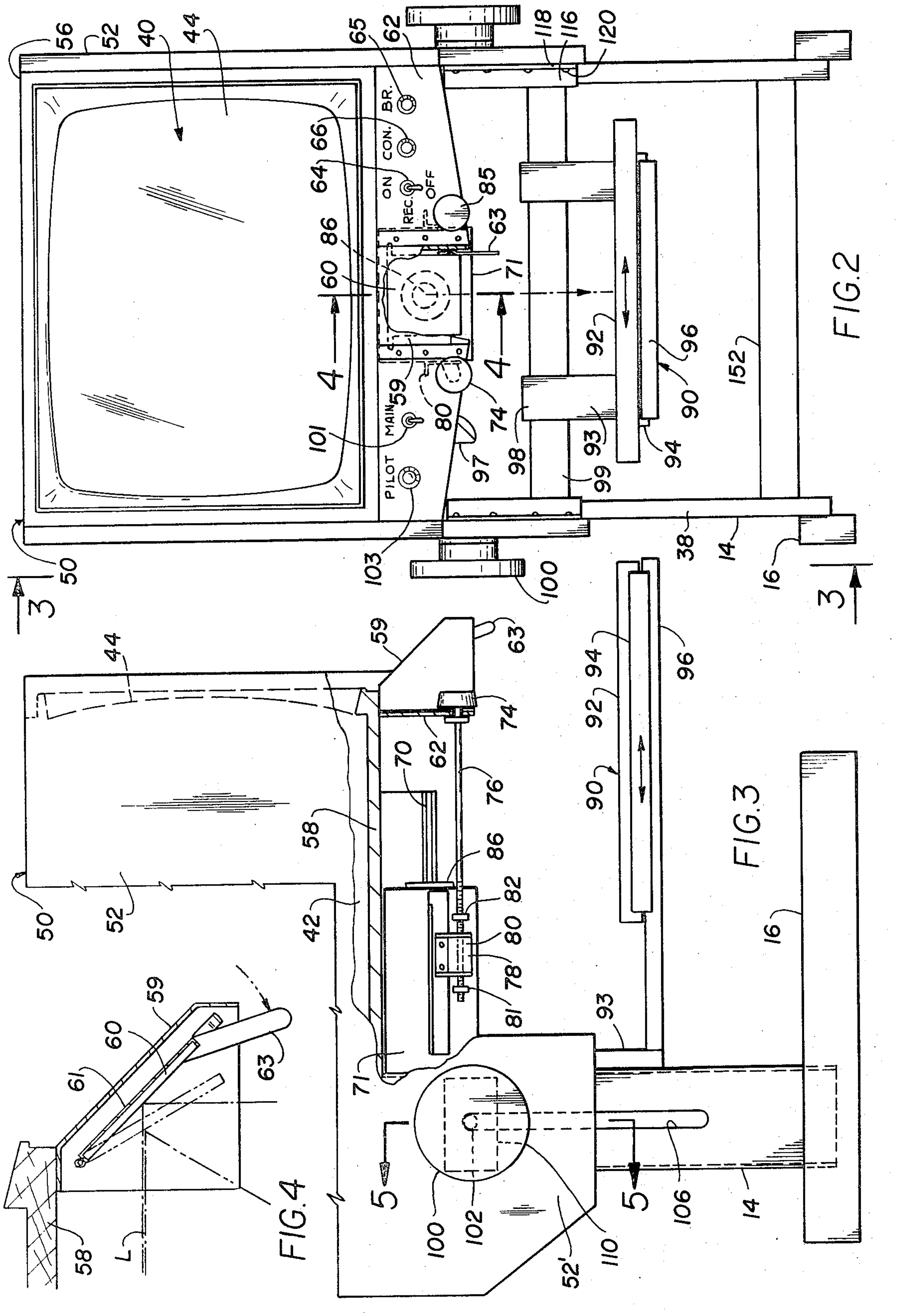
FIG. 2 is a front elevational view on an enlarged scale of the copy enlarging apparatus of FIG. 1.
FIG. 3 is a side elevational view, taken along line 3—3 of FIG. 2, portions being broken away to show internal construction.
FIG. 4 is an enlarged, fragmentary sectional view partially diagrammatic in form taken along line 4—4 of FIG. 2 showing an adjustable mirror.
Figure 5:
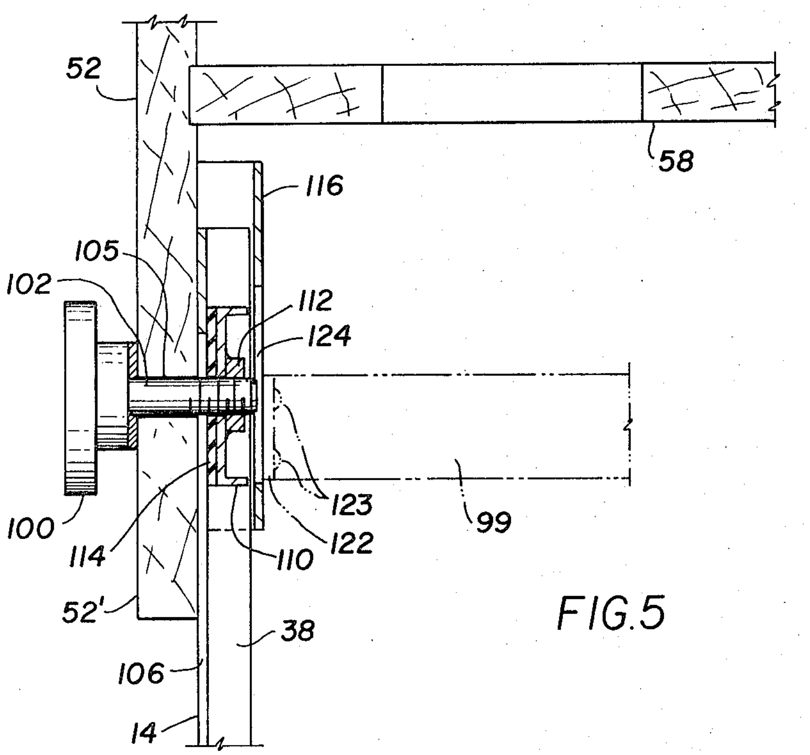
FIG. 5 is a further enlarged sectional view taken along line 5—5 of FIG. 3, showing details of the adjustable support for the television receiver, the television camera and the graphic copy being scanned.
Figure 6:
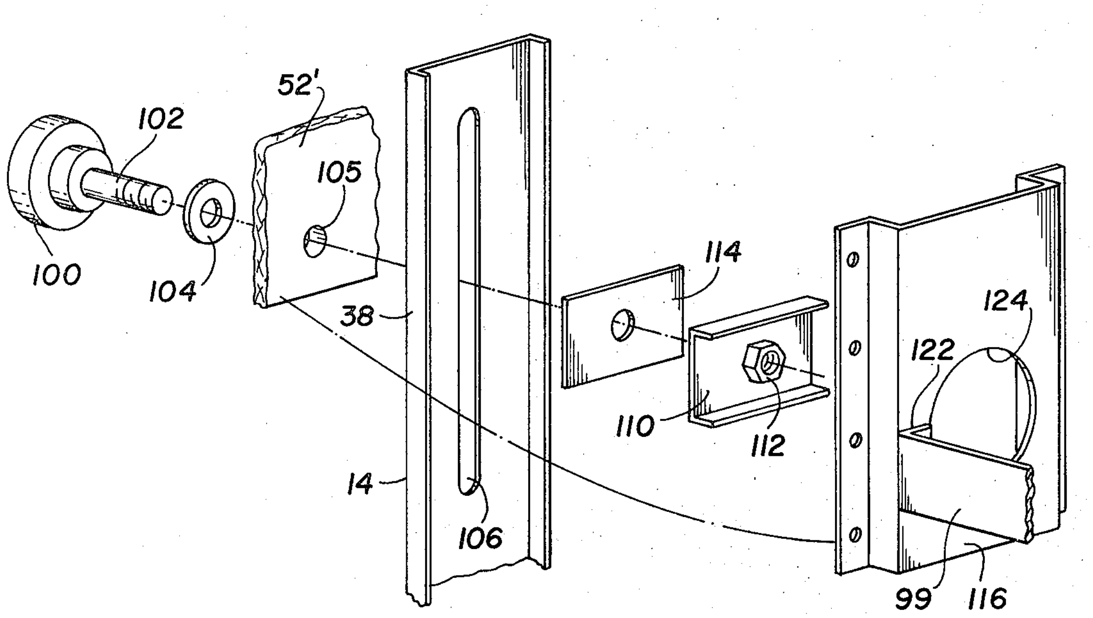
FIG. 6 is an exploded perspective view of parts of the adjustable movable stand shown assembled in FIG. 5.

Referring now to the drawings wherein like reference characters designated like or corresponding parts throughout, there is illustrated in FIGS. 1–3 an image enlarging and display assembly including a support stand generally designated by reference numeral 12. The stand 12 includes a pair of stationary upright legs 14 secured by welding or otherwise at their bottom ends to a pair of horizontal forwardly extending base bars 16. The legs 14 have lateral inturned flanges 38.

The stand supports a television receiver generally designated as reference numeral 40 which includes a horizontal chassis 42 (FIG. 3) and a vertical display screen 44 on which an enlarged graphic image 46 may be displayed. The chassis 42 is mounted inside of a housing generally designated by reference numeral 50 comprising a pair of lateral vertical side walls 52, a back wall 54 and a top wall 56. The chassis 42 rests on a horizontal platform 58 secured between the side walls 52; see FIG. 3. Below the screen 44 and secured to the platforms 58 is a mirror housing 59 which is open at the back and bottom, (see FIG. 4). Inside the housing 59 is a pivotally mounted mirror 60 in a frame 61 which is provided with a handle 63 projecting below the housing for adjusting the angular position of the mirror and optical line of sight L (FIG. 4). The mirror faces downwardly. Also secured to platform 58 is a front control panel 62 provided with a receiver ON-OFF switch 64, and a pair of control knobs 65 and 66 for adjusting the brightness and the contract respectively of the images 46 on the screen 44.

Figure 7:
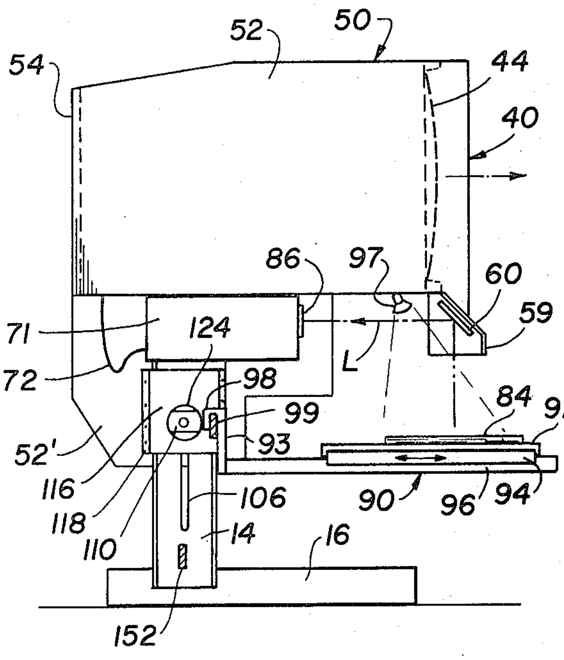
FIG. 7 is a side view, partially in section and partially diagrammatic, on a redued scale, of the assembly of FIG. 1, showing the graphic copy mounting table supported in position for scanning by the television camera.

Secured to the underside of the platform 58 is a pair of horizontally spaced tracks 70 which slidably support television camera 71 connected via a cable 72 (FIG. 7) to the receiver 40. A control knob 74 at the panel 62 is connected to a threaded shaft 76 which engages a threaded bracket 78 secured to a flange 80 on one side of the camera 71. A pair of limit nuts 81, 82 are provided on the shaft 76 at opposite ends of the bracket 78 to limit travel of the camera 71 when the knob 74 is rotated. The camera 71 is thus moved forwardly and back on the tracks 70 for focusing the image 46 of a copy 84 upon a lens 86 of the camera 71. A rotating knob 85 controls zoom and focus of the camera lens 86 by respectively pulling the knob 85.

The graphic copy 84 is supported upon a table 90 which has a top flanged plate 92 movable in a horizontal plane tranversely or from side to side on ball bearings on a lower flanged plate 94 which is movable horizontally back and forth on ball bearings upon a base plate 96 which has a pair of rear vertical bracket arms 93 each provided with a hook 98, which engage upon a crossbar or plate 99 of the stand 12. A lamp 97 is secured to the platform 58 and can be adjustably positioned for illuminating the copy 84. A main switch 101 on the panel 62 turns on the lamp 97 and the camera 71. a pilot light 103 is provided for indicating when the camera 71 is turned on.

The receiver 40, camera 71, mirror 60 and lamp 97 are all adjustably movable vertically on the stand 12. Referring to FIGS. 1–3,5 and 6, it will be noted that a pair of adjustment and locking knobs 100 are provided at outer sides of the side walls 52 which have lower extensions 52' where the knobs 100 are located. Each of the knobs 100 is provided with a threaded stem or bolt 102 which extends axially through a hole 105 in the wall extension 52'. A wahser 104 is interposed between the knob 100 and the outer side of the wall extension 52'. The bolt 102 extends through a vertical slot 106 provided in each leg 14 which has flanges 38 turned inwardly and serving as guides for a movable flanged nut plate 110. A nut 112 is welded to the inner side of the plate 110 and engages the inner end of bolt 102. A resilient rubber friction pad 114 is interposed between the plate 110 and the inner side of the leg 14. When the bolts 102 are tightened by turning knobs 100, the plates 110 and the pads 114 are locked to the inner side of each of the legs 14 so that the assembly of the receiver 40, the camera 71, the mirror 60 and the lamp 97 are secured in a selected vertical position on the stand 12. A pair of flanged guide brackets 116 are secured to the inner sides of the wall extensions 52. Each of the brackets have a flange 118 with a hole 119 for receiving a mounting screw 120. The brackets 116 slide along the outer sides of the flanges 38 of the legs 14 to insure vertical movement of the receiver 40, the camera 71 and the mirror assembly 60. The crossbar or plate 99 is secured between the brackets 116 so that the table 90 can move up and down with the receiver, camera and mirror. The plate 99 has an end flange 122 at each end which is secured by screws 123 to the bracket 116. Each bracket 116 has a hole 124 through which the end of the bolt 102 can protrude and provide access to the plate 110.

FIGS. 1–3, and 7 show the table 90 carried by the crossbar 99. The lamp 97 is adjusted to illuminate the copy 84 on the top plate 92. The mirror 60 is adjusted so that the image of the copy 84 is reflected directly from the copy on a line of sight L to the lens 86 of the television camera 71. The visually handicapped operator will turn on the receiver, camera and lamp by throwing the switches 64 and 101 at the control panel. An enlarged image 46 of the copy 84 will appear on the screen 44. The operator may move the copy from side to side on the table 90 to scan each line of copy and can move the copy longitudinally to scan successive lines.

Figure 8:
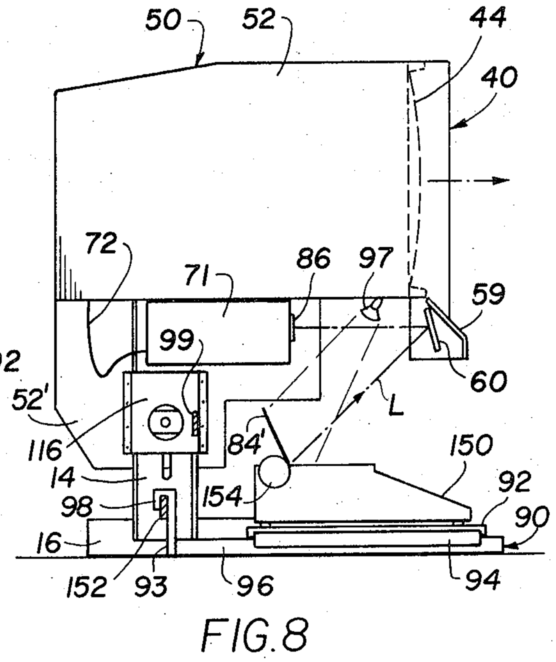
FIG. 8 is a view similar to FIG. 7, showing the graphic copy mounting table in another position supporting a typewriter disposed for scanning by the television camera.

FIG. 8 shows the same apparatus arranged for use with a typewriter 150. The table 90 can be removed from the supporting crossbar 99 and hooks 98 can be engaged on another crossbar 152 extending between the legs 14. This will stabilize the base plate 96. The typewriter can be adjusted on the plates 92, 94 for optimum typing position. The operator will insert a copy sheet 84' under a roller 154 of the typewriter 150. The lamp 97 may be tilted for lighting copy sheet 84'. The mirror 60 can be adjustably positioned by means of the handle 63 for adjusting the line of sight L. The entire assembly of receiver 40, lamp 97, mirror 60 and camera 71 can be lowered if desired for proper adjustment of the line of sight L and for optimum viewing of the screen 44.

From the foregoing description it will be apparant that the invention makes possible viewing of a bright, enlarged image of graphic copy. The copy can be mounted flat on a table or it can be in a typewriter. The copy support table is movable horizontally in mutually perpendicular planes. The copy is scanned by the television camera and the image is electronically conveyed to the television receiver for display on the television screen. The receiver can be moved up or down for optimum viewing and scanning. The apparatus is simple to operate and requires no particular skill or training. Copy magnification can be as large as desired depending on adjustments of the camera and receiver. The camera and receiver per se are conventional so no detailed description is required of these components.

It should be understood that the foregoing relates only to a preferred embodiment of the invention, and that it is intended to cover all changes and modifications of the example of the invention herein chosen for the purposes of the disclosure, which do not constitute departures from the spirit and scope of the invention.

The invention claimed is:

1. Optical enlarging apparatus for a graphic copy comprising

- a first support means for said graphic copy;
- a second support means including a horizontal platform means mounted on said second support means movement in a vertical direction;
- a television camera carried by said platform means and disposed in an optical path including said first support means for scanning said graphic copy; and
- a television signal receiver carried by said platform means and arranged to receive electronically, signals representing the graphic copy scanned by said camera, said receiver having an upright screen disposed adjacent said first support means for displaying bright, visible, enlarged images of said graphic copy.

2. Optical enlarging apparatus as defined in claim 1, further comprising illumination means carried by said second support means and arranged for illuminating said graphic copy while on said first support means; and a mirror adjustably mounted in said optical path and carried by said second support means for passing light reflected from said graphic copy to said camera.

3. Optical enlarging apparatus as defined in claim 2 further comprising means movable mounting said camera on said platform means in said optical path for focusing an image of said graphic copy on said camera.

4. Optical enlarging apparatus as defined in claim 1, wherein said first support means comprises a horizontal table including;

a pair of spaced arms;

a first member mounted on said arms and movable in one horizontal direction; and a second member mounted on said first member and movable in a second horizontal direction perpendicular to said first horizontal direction whereby said graphic copy carried by said table is movable in both horizontal directions in said optical path while being scanned by said camera.

5. Optical enlarging apparatus as defined in claim 4, further comprising:

illumination means carried by said platform means and arranged for illuminating said graphic copy while on said first support means;

a mirror adjustably mounted in said optical path for passing light reflected from said graphic copy to said camera; and means movably mounting said camera on said platform means in said optical path for focusing an image of said graphic copy on said camera.

6. Optical enlarging apparatus as defined in claim 5, wherein said second support means further comprises;

a housing for said television receiver, said housing mounted on said platform;

a pair of upright stationary legs disposed at opposite sides of said platform; and adjustable locking means joining said legs and platform so that the height of said housing with respect to said first support means can be adjustably fixed.

7. Optical enlarging means as defined in claim 3, wherein said second support means further comprises:

a housing for said television receiver, said housing mounted on said platform;

a pair of upright stationary legs disposed at opposite sides of said platform; and adjustable locking means joining said legs and platform so that the height of said housing with respect to said first support means can be adjustably fixed.

8. Optical enlarging apparatus as defined in claim 1, wherein said second support means is a stand comprising;

a housing for said television receiver, said housing mounted on said platform;

a pair of upright stationary legs disposed at opposite sides of said platform; and adjustable locking means joining said legs and platform so that the height of said housing with respect to said first support means can be adjustably fixed.

9. Optical enlarging apparatus as defined in claim 8 wherein said first support means comprises a horizontal table including:

a pair of spaced arms;

a first member mounted on said arms and movable in one horizontal direction; and a second member mounted on said first member and movable in a second horizontal direction perpendicular to said first horizontal direction whereby said graphic copy carried by said table is movable in both horizontal directions in said optical path while being scanned by said camera.

10. Optical enlarging apparatus as defined in claim 9, wherein said first support means further comprises means for detachably engaging said table with said stand in different vertical positions to accommodate said graphic copy of different sizes and to stabilize said table in said optical path, whereby a typewriter can be mounted on said table and disposed in said optical path so that said graphic copy carried by said typewriter is optically scanned by said television camera.

* * * * *